(12) United States Patent
Offe

(10) Patent No.: US 9,168,973 B2
(45) Date of Patent: Oct. 27, 2015

(54) MOTORCYCLE SUSPENSION SYSTEM

(71) Applicant: Andrew Offe, Willunga (AU)

(72) Inventor: Andrew Offe, Willunga (AU)

( * ) Notice: Subject to any disclaimer, the term of this patent is extended or adjusted under 35 U.S.C. 154(b) by 0 days.

(21) Appl. No.: 14/139,093

(22) Filed: Dec. 23, 2013

(65) Prior Publication Data
US 2014/0183838 A1    Jul. 3, 2014

(30) Foreign Application Priority Data

Dec. 24, 2012 (AU) ................. 2012275034

(51) Int. Cl.
*B62K 25/28*    (2006.01)

(52) U.S. Cl.
CPC ................... *B62K 25/283* (2013.01)

(58) Field of Classification Search
CPC ................................... B62K 25/283
USPC ................... 280/283, 284; 180/227
See application file for complete search history.

(56) References Cited

U.S. PATENT DOCUMENTS

| | | | | | |
|---|---|---|---|---|---|
| 2,592,981 | A | * | 4/1952 | Hans | 180/227 |
| 2,604,179 | A | * | 7/1952 | Gilardi | 180/225 |
| 3,269,480 | A | * | 8/1966 | Kirby | 180/225 |
| 5,452,910 | A | * | 9/1995 | Harris | 280/284 |
| 5,628,524 | A | * | 5/1997 | Klassen et al. | 280/284 |
| 5,749,591 | A | * | 5/1998 | Thurm | 280/284 |
| 5,791,674 | A | * | 8/1998 | D'Aluisio et al. | 280/284 |
| 6,123,165 | A | * | 9/2000 | Smith | 180/227 |
| 6,203,042 | B1 | * | 3/2001 | Wilcox | 280/284 |
| RE39,159 | E | * | 7/2006 | Klassen et al. | 280/284 |
| 2004/0145149 | A1 | * | 7/2004 | Ellsworth et al. | 280/284 |

* cited by examiner

*Primary Examiner* — Kevin Hurley
*Assistant Examiner* — Gabriela C Craciun
(74) *Attorney, Agent, or Firm* — Schwegman Lundberg & Woessner, P.A.

(57) ABSTRACT

The present invention relates to a suspension system for a motorcycle and to frames incorporating such a suspension system. The suspension system includes a swing arm arranged for pivotal movement about a first pivot axis. The swing arm is also arranged for connection at a second location via respective axle plates to a rear wheel axle of the motorcycle. The swing arm is arranged for connection at a third location to a suspension arrangement in the form of a shock absorber arrangement. The first pivot axis is located between the second and third locations.

19 Claims, 2 Drawing Sheets

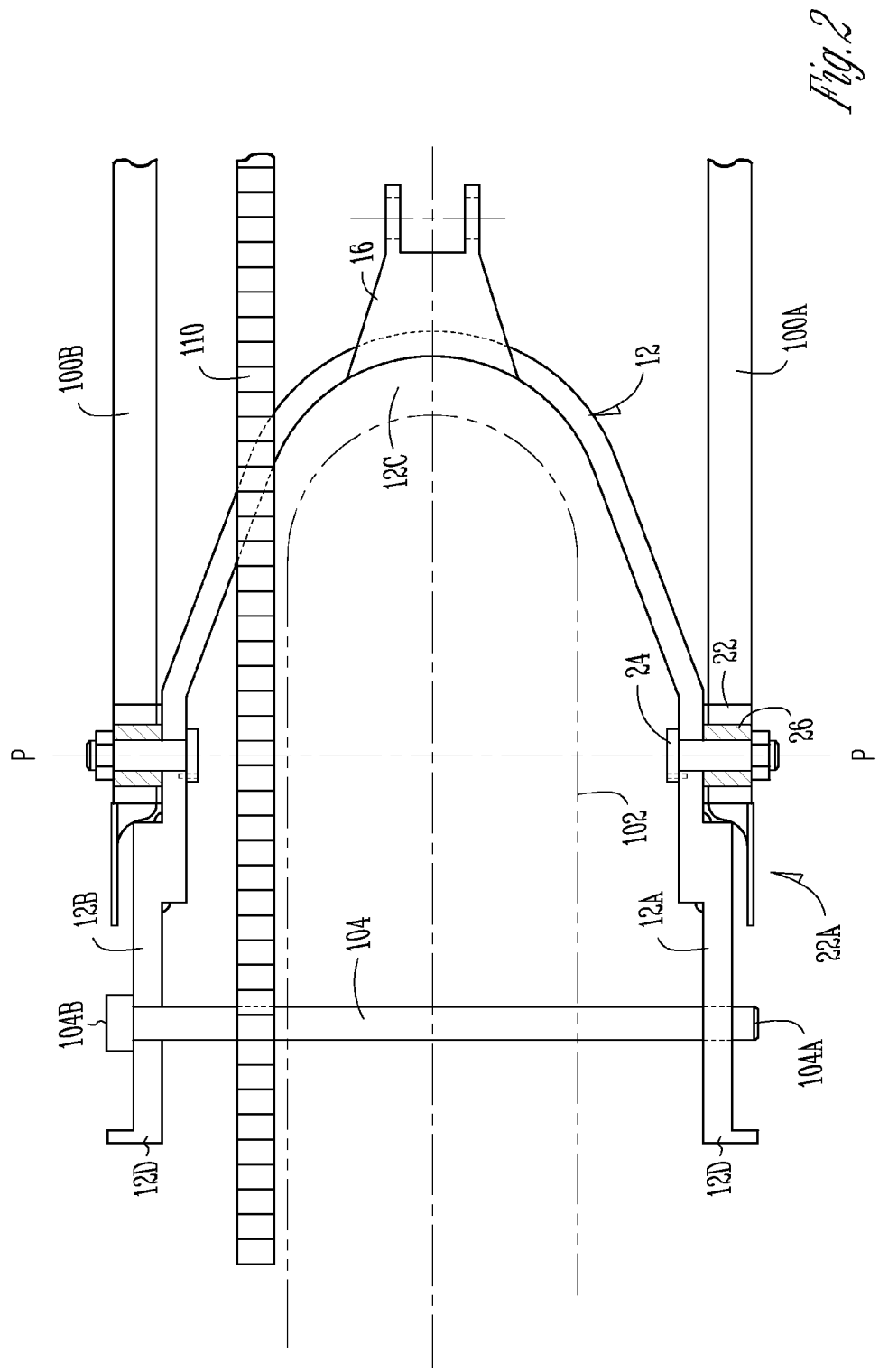

MOTORCYCLE SUSPENSION SYSTEM

RELATED APPLICATIONS

This application claims the benefit of priority to Australian Patent Application Serial No. 2012275034, filed Dec. 24, 2012, which is incorporated herein by reference in its entirety.

FIELD OF THE INVENTION

The present invention relates to a suspension system for a motorcycle and also to frames including such a suspension system.

BACKGROUND OF THE INVENTION

Rigid frame motorcycles are those that do not include any suspension system for the rear wheel. The axle of the rear wheel is fixed to the frame and the frame does not allow any up and down movement. No form of suspension is provided to the rear wheel. Such frames are commonly described as "rigid" or "hard tail" frames. In contrast, "sprung" or "soft tail" motorcycle frames incorporate an axle mounting with some form of spring or shock absorber arrangement. For example, one or a pair of springs or shock absorbers may be connected to the frame at any angle to act directly on the axle, or to allow the axle to move via a swing arm that is connected to the frame. The spring or shock absorber is attached to the frame at one end and to the swing arm at the other end. The current standard swing arm arrangement is that the spring or a linkage on which the spring acts is attached to the swing arm at a point between the axle connection to the swing arm and the pivotal connection of the swing arm to the frame.

Swing arm type motorcycle rear suspension systems have the swing arm pivotally connected to the frame at a location close to the gearbox of the motorcycle and supported by springs or shock absorbers close to the rear axle. A more rigid version includes a triangulated swing arm pivoted close to the rear of the gear box and supported by one or two shock absorbers mounted either side of the seat of the motorcycle or under the gear box.

Another suspension system used before the advent of swing arm systems includes vertically mounted springs or shock absorbers located at both ends of the rear of the frame with the axle attached towards the middle of the spring unit.

Rigid frame motorcycles have a unique appearance by virtue of their generally low stance, low seat position, overall design simplicity and flowing lines. Design simplicity and low seat position is achieved by removing non-essential parts including the rear wheel suspension. Such frames are also light in weight and this is an important factor for most riders who choose to ride such motorcycles.

As a consequence of not including any suspension for the rear wheel, the ride of the motorcycle is poor in bumpy conditions and during cornering. Many older riders find riding such motorcycles uncomfortable. Control of the motorcycle, particularly when cornering is also an issue.

In order to make the ride of such motorcycles more comfortable, attempts have been made to provide suspension to the rear wheel whilst still maintaining the rigid frame appearance. Most of these attempts have not been very successful.

The present invention seeks to provide a suspension system for the rear wheel of a motorcycle that retains the general appearance of a rigid frame.

The discussion of the background to the invention herein is included to explain the context of the invention. This is not to be taken as an admission that any of the material referred to was published, known or part of the common general knowledge as at the priority date of this application.

SUMMARY OF THE INVENTION

According to the present invention there is provided a motorcycle suspension system including a swing arm arranged for pivotal movement about a first pivot axis, said swing arm arranged for connection at a second location to a rear wheel axle and said swing arm arranged for connection at a third location to a suspension arrangement and wherein the first pivot axis is located between the second and third locations.

The suspension arrangement may include a spring arrangement, dampener arrangement, shock absorber arrangement or any other arrangement that provides some form of suspension or dampening of the movement of the rear axle.

In accordance with one embodiment of the invention, the swing arm is arranged to be pivotally connected to the frame so that the swing arm can pivot about the first pivot axis. The swing arm is preferably a generally U-shaped member having first and second side members and a front end part. Each of the first and second side members includes a rear end. It will of course be understood that the shape of the swing arm may vary.

The first and second side members of the swing arm are arranged in use to be located either side of the rear wheel and to be connected to the respective end parts of the rear wheel axle. The connection between the respective end parts of the rear wheel axle and the first and second side members of the swing arm is via respective axle plates and is a fixed or secured connection. Each axle plate is connected, for example by welding, to the rear end of one of the first and second side members of the swing arm.

The front end part of the swing arm includes the third location at which the swing arm is arranged for connection to the suspension arrangement. The suspension arrangement in one simple form is a shock absorber arrangement including a top mount, a shock absorber and a bottom mount. The top mount is arranged to provide connection between the swing arm and the shock absorber. The bottom mount provides a connection between the shock absorber and a frame of the motorcycle. In an alternative arrangement, the shock absorber is replaced with a spring or some other form of dampening system.

It will be appreciated by a person skilled in the art that the suspension arrangement may adopt different forms. For example, a simple spring arrangement could be adopted, air or gas shock absorbers and both single and multiple shock absorbers could be used. The spring can take different forms, such as a coil spring, and the spring(s) may be mounted in different locations and orientations. The shock absorber may, for example, be a gas, liquid or friction type system. The spring arrangement could also be mounted to the top of the frame and stretched rather than compressed under load.

The motorcycle includes a frame that is typically made from metal tubing and is arranged to support the various components of the motorcycle. In one form, the frame includes right and left side parts that extend either side of the rear wheel. Each of the right and left side parts are formed from upper and lower parts that join at rear end so as to form a generally V or U-shape.

Each side member of the swing arm is arranged for pivotal connection to the frame of the motorcycle. The pivotal connection of each side member to the frame enables the swing arm to pivot with respect to the frame about the first pivot axis. The pivotal connection of the swing arm to the frame may be a direct connection to the frame or may be via another member. For example, the swing arm may be pivotally connected to a cross member extending between parts of the frame.

Preferably, the ends of each cross member are welded to the upper and lower parts of the respective right or left side parts of the frame. A shaft and bearing arrangement is preferably provided with each cross member to enable the pivotal connection of the respective side member thereto.

It will of course be appreciated that the configuration of the frame may altered so that the cross member is incorporated into or integrally formed with the frame.

The present invention further provides a motorcycle frame including a motorcycle suspension system including a swing arm arranged for pivotal movement about a first pivot axis, said swing arm arranged for connection at a second location to a rear wheel axle and said swing arm arranged for connection at a third location to a suspension arrangement and wherein the first pivot axis is located between the second and third locations.

The invention also relates to a kit of parts for modifying a conventional sprung, plunger or rigid motorcycle frame to include a suspension system in accordance with an embodiment of the present invention.

DESCRIPTION OF THE DRAWINGS

Embodiments of the invention will now be described, by way of example only, with reference to the accompanying drawings in which:

FIG. 2 is a schematic cross-section view of FIG. 1 taken general horizontally from above the height of the chain of the motorcycle.

DETAILED DESCRIPTION OF PREFERRED EMBODIMENTS OF THE INVENTION

Figure 1:
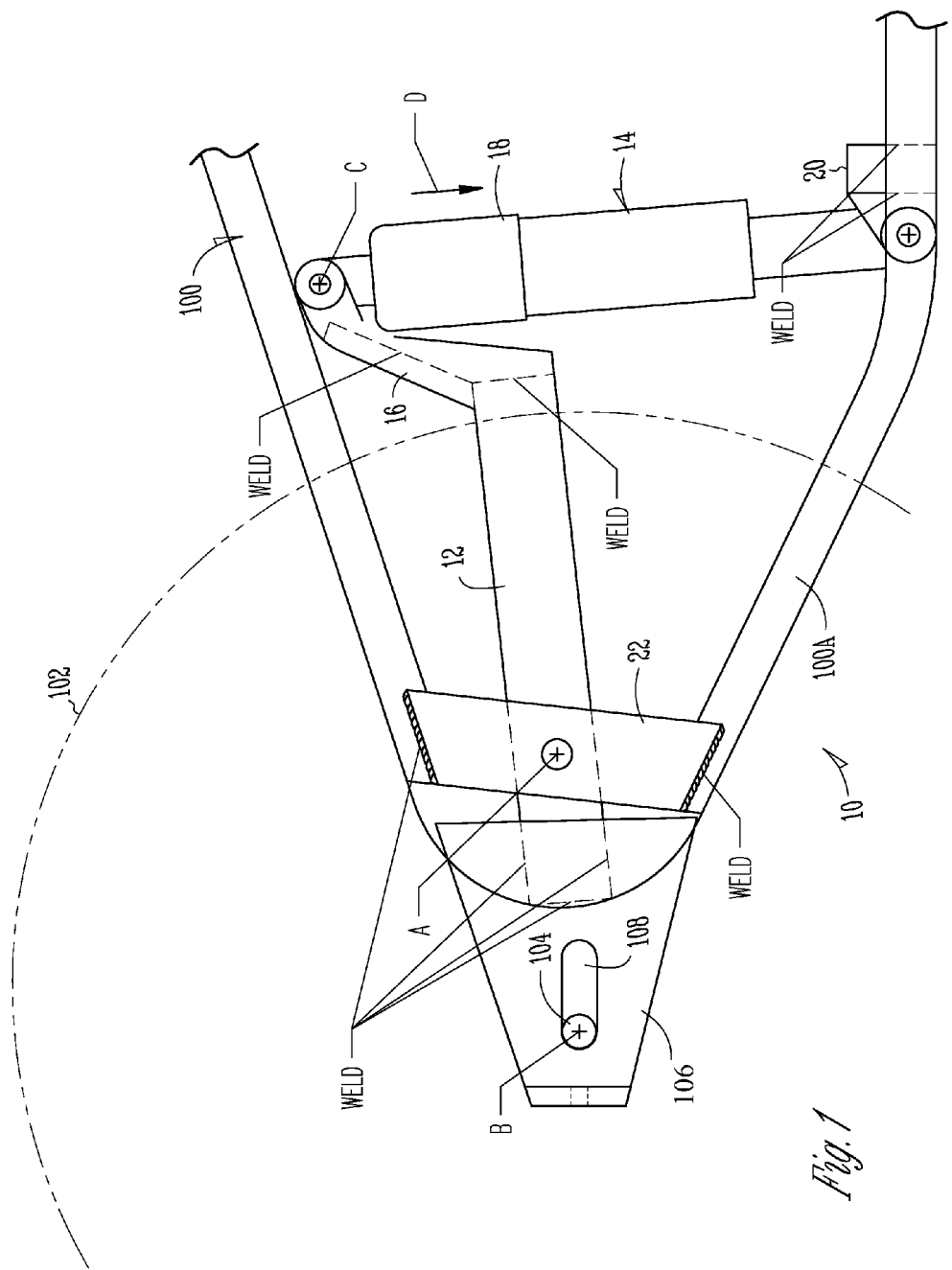
FIG. 1 is a schematic side view of the rear end of a motorcycle frame including a suspension system according to an embodiment of the invention.

FIG. 1 illustrates a suspension system 10 fitted to a frame 100 (only partly shown) of a motorcycle. The frame 100 is made from metal tubing and is arranged to support the engine (not shown) and other components of the motorcycle in a conventional manner. The configuration of the frame 100 may vary and the present invention is not intended to be limited to a particular frame configuration.

The frame 100 includes right and left side parts that extend either side of a rear wheel 102 of the motorcycle. The dashed lines in FIG. 1 illustrate the positioning of a rear wheel 102 of the motorcycle.

The right and left side parts of the frame 100 are formed from upper and lower parts 100A, 100B that join at the rear end so as to form a generally V or U-shape (see dashed lines in FIG. 1).

The motorcycle suspension system 10 includes a swing arm 12 arranged for pivotal movement about a first pivot axis P-P. The end of the first pivot axis P-P is depicted at a first location A in FIG. 1 and the pivot axis P-P extends in a direction into the page of FIG. 1. As will be explained below, the swing arm 12 is arranged for connection at a second location B to a rear wheel axle 104. The length of the axle 104 and the pivot axis P-P extend generally parallel to one another. This arrangement is best shown in FIG. 2.

The swing arm 12 is also arranged for connection at a third location C to a suspension arrangement which, in accordance with this embodiment, is a shock absorber arrangement 14. The first pivot axis P-P and hence the first location A (see FIG. 1) is located between the second location B and the third location C when viewing the suspension system 10 from the side of the motorcycle. Hence, when looking at FIG. 1, the second location B is located at the axle 104, then the first location A is located generally to the right thereof and then the third location C is located to generally to the right of the first location A.

As best shown in FIG. 2, the swing arm 12 is a generally U-shaped member having first and second side members 12A, 12B and a front end part 12C. Each of the first and second side members 12A, 12B includes a rear end 12D.

The first and second side members 12A, 12B of the swing arm 12 are arranged in use to be located either side of the rear wheel 102 and to be connected to the respective end parts 104A, 104B of the rear wheel axle 104 via respective axle plates 106.

An axle plate 106 is attached to the end 12D of each of the first and second side members 12A, 12B. An axle slot 108 is located in each of the axle plates 106 and provides an ability to adjust the positioning of the rear wheel 102 relative to the frame 100 for tensioning of the drive chain or belt 110.

The connection between the respective end parts 104A, 104B of the rear wheel axle 104 and the axle plate 106 and hence the first and second side members 12A, 12B of the swing arm 12 is a rigid or secured connection. However, the connection allows for movement of the axle 104 for chain tensioning by repositioning the axle 104 within the axle slot 108. FIG. 2 best depicts the shape of the swing arm 12 and also shows the positioning of the drive chain 110 of the motorcycle.

The front end part 12C of the swing arm 12 includes the third location C at which the swing arm 12 is arranged for connection to the shock absorber arrangement 14. The shock absorber arrangement 14 as shown in the Figures includes a first or top mount 16, a single shock absorber 18 and a second or bottom mount 20. The top mount 16 is arranged to be connected to the front end part 12C of the swing arm 12 and also to an upper end of the shock absorber 18. The bottom mount 20 provides a connection between the lower end of the shock absorber 18 and the frame 100 of the motorcycle. The bottom mount 20 extends generally horizontally between the right and left side parts of the frame 100.

Each side member 12A, 12B of the swing arm 12 is arranged for pivotal connection to a respective cross member 22 that is rigidly connected to the frame 100, for example by welding. Each cross member 22 extends between the upper and the lower parts 10A, 100B of the associated right or left side of the frame 100. Accordingly, there is one cross member 22 located on either side of the rear wheel 102.

The pivotal connection of each side member 12A, 12B to the associated cross member 22 enables the side members 12A, 12B and hence the swing arm 12 to pivot about the first pivot axis P-P and thus relative to the frame 100. As best shown in FIG. 2, a very simple pivotal connection includes a shaft 24 that is rigidly connected to the respective side member 12A, 12B and that extends through a bearing 26 mounted in the associated cross member 22. Each shaft 24 is arranged to be rotatable relative to the associated bearing 26 so that each side member 12A, 12B and hence the swing arm 12 is able to pivot about the pivot axis P-P. Pivot axis P-P is coaxial with the longitudinal central axis of the shafts 24. It will be appreciated that the longitudinal central axis of the shaft 24 associated with each of the side members 12A, 12B of the swing arm 12 are collinear.

As best shown in FIG. 2, each cross member 22 may include a shroud 22A extending in the direction of the rear wheel 102. The shroud 22A is provided to for aesthetic reasons.

During use of the motorcycle, the suspension system 10 provides suspension to the rear wheel 102 of the motorcycle. For example, when the rear wheel 102 goes over a bump in the road, the axle 104 of the rear wheel 102 will be moved upwardly away from a base height. When this occurs, the connection between the ends 104A, 104B of the axle 104, axle plate 106 and the side members 12A, 12B of the swing arm 12 will cause the swing arm 12 to pivot about the pivot axis P-P so that the front end part 12C of the swing arm 12 will to move in the direction of the arrow D shown in FIG. 1. Similarly, when the rear wheel 102 drops into a depression, the axle 104 of the rear wheel will be moved downwardly away from the base height or normal ground level. This will result in the swing arm 12 pivoting about the pivot axis P-P so that the front end part 12C of the swing arm 12 is moved in the direction opposite to that shown by the arrow D. As the front end part 12C of the swing arm 12 is connected to a shock absorber arrangement 14, movement of the swing arm 12 about the pivot axis P-P in response to movement of the axle 104 away from the base height is dampened. Accordingly, the axle 104 is effectively sprung and dampened providing a more comfortable ride and improved handling.

It will also be appreciated that the described suspension system 10 provides an advantage over conventional swing arm systems because the axle's tendency to twist relative to the frame 100 is reduced by the shorter distance between the axle 104 and the pivot point P-P.

When the wheel is mounted as per a conventional swing arm, the axle end of the swing arm will be subject to such a twisting effect. The longer the side members of the swing arm, the stronger they need to be. One of the advantages of embodiments of the present invention is the comparative shortness of the distance between the axle 104 and the pivot point P-P and hence the shorter effective lengths of the side members 12A, 12B of the swing arm 12.

It will further be appreciated that a sissy bar (not illustrated) for the motorcycle and also a rear guard bracket (not illustrated) can be mounted directly off the frame 100 despite the inclusion of the suspension system 10.

It will of course be appreciated that in accordance with an embodiment of the invention, the configuration of the frame may be altered so that the cross member is incorporated into or integrally formed with the frame.

In accordance with a preferred embodiment of the invention, the first pivot axis P-P is located in use at a height above a ground level greater than a height of the axle 104 of the rear wheel 102 of the motorcycle.

It is envisaged that the form of the shock absorber arrangement 14 used to dampen movement of the swing arm 12 may vary and the present invention is not intended to be limited to the particular arrangement shown in the Figures. Other mounting positions of the shock absorber arrangement on the frame 100 are also envisaged.

The described embodiment of the invention is advantageous because it make the ride of the motorcycle more comfortable because of the inclusion of the suspension system but still maintains an appearance very similar to a rigid or hard tail frame motorcycle.

The embodiments have been described by way of example only and modifications within the spirit and scope of the invention are envisaged.

What is claimed is:

1. A motorcycle suspension system comprising:
   a swing arm arranged for pivotal connection to a frame of a motorcycle for movement about a first pivot axis, said frame including a right side part and a left side part, the right side part and left side part extend either side of a rear wheel of the motorcycle, said swing arm arranged for connection at a second location to an axle of the rear wheel and said swing arm arranged for connection at a third location to a suspension arrangement and
   wherein the first pivot axis is located adjacent to the right side part and the left side part of the frame such that the first pivot axis is positioned to intersect the rear wheel and between the second and third locations.

2. The motorcycle suspension system according to claim 1 wherein the swing arm is a generally U or V-shaped member having first and second side members and a front end part.

3. The motorcycle suspension system according to claim 2 wherein the first and second side members of the swing arm are arranged in use to be located either side of the rear wheel and to be connected respectively to first and second ends of the rear wheel axle.

4. The motorcycle suspension system according to claim 3 wherein the connection between the first and second ends of the rear wheel axle and the first and second side members of the swing arm is via respective axle plates.

5. The motorcycle suspension system according to claim 3 wherein the connection between the first and second ends of the rear wheel axle and the swing arm is a rigid connection.

6. The motorcycle suspension system according to claim 3 wherein the front end part of the swing arm includes the third location at which the swing arm is arranged for connection to the suspension arrangement.

7. The motorcycle suspension system according to claim 1 wherein the suspension arrangement includes at least one of a spring arrangement, or a shock absorber arrangement, or a dampening arrangement.

8. The motorcycle suspension system according to claim 1 wherein the suspension arrangement includes a first mount, a second mount, and a shock absorber or a spring arrangement.

9. The motorcycle suspension system according to claim 8 wherein the first mount is arranged to provide connection between the swing arm and either the shock absorber or spring arrangement.

10. The motorcycle suspension system according to claim 8 wherein the second mount is arranged to provide a connection between the shock absorber or spring arrangement and the frame of the motorcycle.

11. The motorcycle suspension system according to claim 2 wherein each of the first and second side members of the swing arm is arranged for pivotal connection to the frame of the motorcycle.

12. The motorcycle suspension system according to claim 11 wherein the pivotal connection is established by a shaft and a bearing arrangement.

13. The motorcycle suspension system according to claim 12 wherein the shaft and bearing arrangement establish a connection to respective cross members which are each in turn connected to the frame.

14. The motorcycle suspension system according to claim 13 wherein the cross member is arranged to be welded to parts of the frame.

15. A motorcycle frame including a suspension system according to claim 1.

16. A kit of parts for a motorcycle suspension, said kit including a swing arm and a suspension arrangement, wherein the swing arm is arranged in use for pivotal connection to a frame of a motorcycle for movement about a first pivot axis, said frame including a right side part and a left side part, the right side part and the left side part extend either side of a rear wheel of the motorcycle, said swing arm arranged in use for connection at a second location to an axle of the rear wheel and said swing arm arranged for connection in use at a third location to the suspension arrangement and wherein the first pivot axis is located adjacent the right side part and the left side part of the frame such that the first pivot axis is positioned to intersect the rear wheel and between the second and third locations.

17. The kit of parts according to claim 16 wherein the suspension arrangement includes a spring arrangement or a shock absorber arrangement.

18. A motorcycle including a suspension system according to claim 1 or a frame according to claim 15.

19. The motorcycle suspension system according to claim 1 wherein the first pivot axis is located within the diameter of the rear wheel.

* * * * *